US008861790B2

(12) United States Patent
Reeves

(10) Patent No.: US 8,861,790 B2
(45) Date of Patent: Oct. 14, 2014

(54) SYSTEM AND METHOD FOR GUIDING A MOBILE DEVICE

(75) Inventor: Brad Jeremy Reeves, Everett, WA (US)

(73) Assignee: The Boeing Company, Chicago, IL (US)

( * ) Notice: Subject to any disclaimer, the term of this patent is extended or adjusted under 35 U.S.C. 154(b) by 207 days.

(21) Appl. No.: 13/526,238

(22) Filed: Jun. 18, 2012

(65) Prior Publication Data

US 2013/0336537 A1 Dec. 19, 2013

(51) Int. Cl.
*G06K 9/00* (2006.01)
(52) U.S. Cl.
USPC ........................................................ 382/104
(58) Field of Classification Search
None
See application file for complete search history.

(56) References Cited

U.S. PATENT DOCUMENTS 7,599,756 B2 10/2009 Reeves et al.
2010/0230198 A1 9/2010 Frank et al.

OTHER PUBLICATIONS

Cherubini, Andrea, et al. "A vision-based path planner/follower for an assistive robotics project." VISAPP (Workshop on on Robot Vision). 2007.*

* cited by examiner

*Primary Examiner* — Nirav G Patel
(74) *Attorney, Agent, or Firm* — Yee & Associates, P.C.

(57) ABSTRACT

A method, apparatus and system for guiding a number of mobile devices. An image of a portion of an environment around a mobile device in the number of mobile devices is received from a sensor system associated with the mobile device. A set of pixels in the image that meets a standard is identified. A centroid for the set of pixels that meets the standard is identified. A number of commands for guiding the mobile device within the environment is generated based on the centroid.

17 Claims, 6 Drawing Sheets

FIG. 6
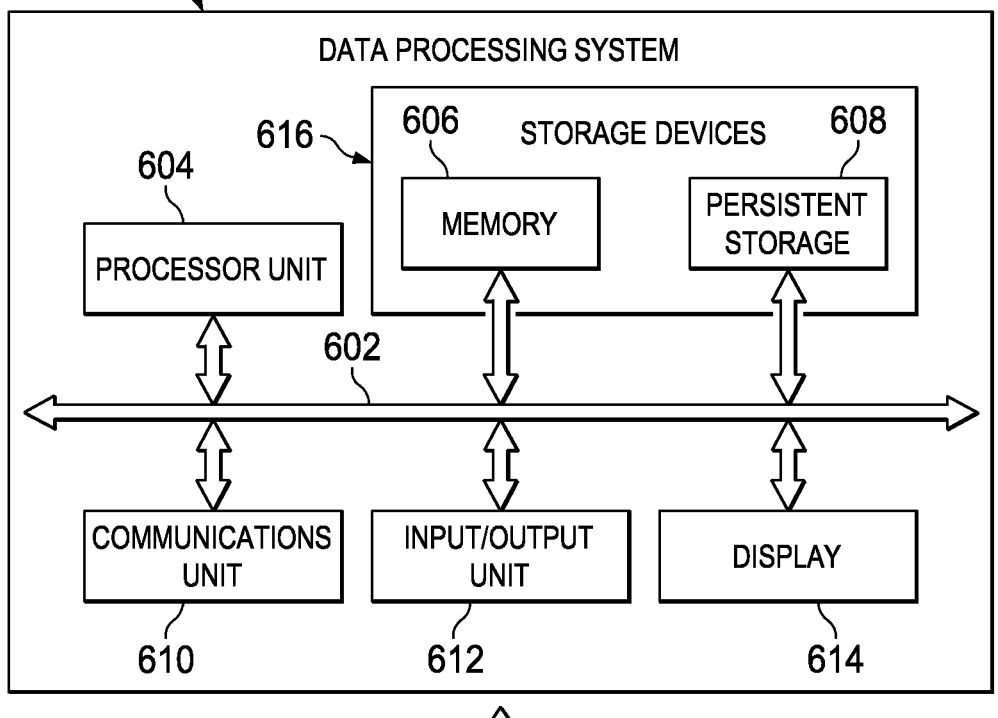
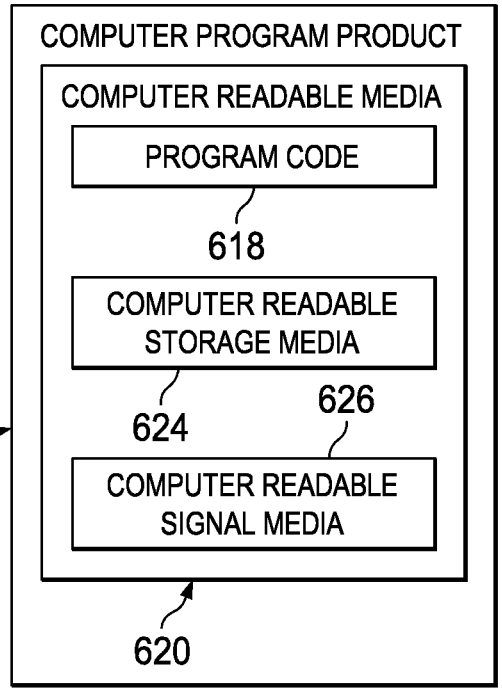

SYSTEM AND METHOD FOR GUIDING A MOBILE DEVICE

BACKGROUND INFORMATION

1. Field

The present disclosure relates generally to mobile devices, and in particular, to guiding mobile devices. Still more particularly, the present disclosure relates to a method and apparatus for guiding a mobile device within an environment using a number of images of the environment.

2. Background

Automated guided vehicles (AGVs) may be used to perform different types of operations. For example, these types of vehicles may be used for towing objects, carrying loads, transporting materials, performing forklift operations, and/or performing other suitable types of operations. As used herein, an "automated guided vehicle" is a mobile robot that is capable of following a path without requiring human assistance.

Typically, the path for an automated guided vehicle is formed on the ground on which the automated guided vehicle will move. As one illustrative example, a path may be formed by cutting a slot into the floor of a facility and embedding a wire in this slot. The automated guided vehicle uses a sensor to detect a radio frequency signal transmitted from the wire. The automated guided vehicle uses this detected radio frequency signal to follow the wire embedded in the floor.

In another illustrative example, a path is formed by placing tape on the ground. The tape may be, for example, without limitation, colored tape or magnetic tape. An automated guided vehicle may use any number of sensors to follow the path formed by the tape. Creating a path for an automated guided vehicle on the ground using tape may be less expensive and less time-consuming than creating the same path by embedding a wire in the ground.

Additionally, using colored tape may be less expensive than using magnetic tape. However, colored tape may become dirty, damaged, and/or broken off in high traffic areas on the ground. A high traffic area on the ground is an area that experiences an increased amount of foot traffic and/or vehicle traffic. In a high traffic area, the appearance of colored tape may be different as compared to the colored tape in a low traffic area. Consequently, some currently available automated guided vehicles may be unable to follow the colored tape in these high traffic areas with a desired level of accuracy.

Some currently available automated guided vehicles use laser systems and/or three-dimensional imaging systems to follow predefined paths. However, these types of systems may be more expensive than desired. Further, these types of systems may increase the weight of and/or the number of components in an automated guided vehicle more than desired. Therefore, it would be desirable to have a method and apparatus that takes into account at least some of the issues discussed above, as well as other possible issues.

SUMMARY

In one illustrative embodiment, a method for guiding a number of mobile devices is present. An image of a portion of an environment around a mobile device in the number of mobile devices is received from a sensor system associated with the mobile device. A set of pixels in the image that meets a standard is identified. A centroid for the set of pixels that meets the standard is identified. A number of commands for guiding the mobile device within the environment is generated based on the centroid.

In another illustrative embodiment, an apparatus comprises a sensor system associated with a mobile device and a controller. The sensor system is configured to generate an image of a portion of an environment around the mobile device. The controller is configured to receive the image of the portion of the environment around the mobile device from the sensor system. The controller is further configured to identify a set of pixels in the image that meets a standard. The controller is further configured to identify a centroid for the set of pixels that meets the standard. The controller is further configured to generate a number of commands for guiding the mobile device within the environment based on the centroid.

In yet another illustrative embodiment, a guidance system comprises a number of sensor systems and a number of controllers. A sensor system in the number of sensor systems is associated with a corresponding mobile device in a number of mobile devices. A controller in the number of controllers is configured to receive an image of a portion of an environment around a mobile device in the number of mobile devices from a corresponding sensor system in the number of sensor systems associated with the mobile device. The controller is further configured to identify a set of pixels in the image that meets a standard. The controller is further configured to identify a centroid for the set of pixels that meets the standard. The controller is further configured to generate a number of commands for guiding the corresponding mobile device within the environment based on the centroid.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a data processing system in accordance with an illustrative embodiment.

DETAILED DESCRIPTION

The different illustrative embodiments recognize and take into account one or more different considerations. For example, the different illustrative embodiments recognize and take into account that some currently available automated guided vehicles follow paths using sensors that are located close to the ground. These types of sensors may be susceptible to undesired effects caused by contact with foreign objects when the automated guided vehicle moves along the ground. As used herein, a "foreign object" is an object external to the automated guided vehicle.

For example, in some cases, the sensors on an automated guided vehicle may be located less than half an inch above the ground. These sensors may become scratched or may break when they contact objects on the ground over which the automated guided vehicle is moving. The different illustrative embodiments recognize and take into account that it may be desirable to have an automated guided vehicle that can follow a path using a single sensor located at a distance from the ground that reduces the possibility of objects on the ground contacting the sensor.

Further, the different illustrative embodiments recognize and take into account that some currently available automated guided vehicles may be unable to follow a path formed using colored tape over time with a desired level of accuracy. Although inexpensive relative to magnetic tape, colored tape is more susceptible to changing color, becoming dirty, tearing, and/or other undesired effects. The different illustrative embodiments recognize and take into account that it may be desirable to have a guidance system that allows an automated guided vehicle to follow colored tape with a desired level of accuracy even when the colored tape has experienced these types of undesired effects.

Thus, the different illustrative embodiments provide a method and apparatus for guiding a mobile device. The mobile device may be, for example, an automated guided vehicle or some other suitable type of device capable of moving. In particular, the different illustrative embodiments provide a method and apparatus for guiding a mobile device without increasing the weight, size, cost, and/or complexity of the mobile device more than desired.

Figure 1:
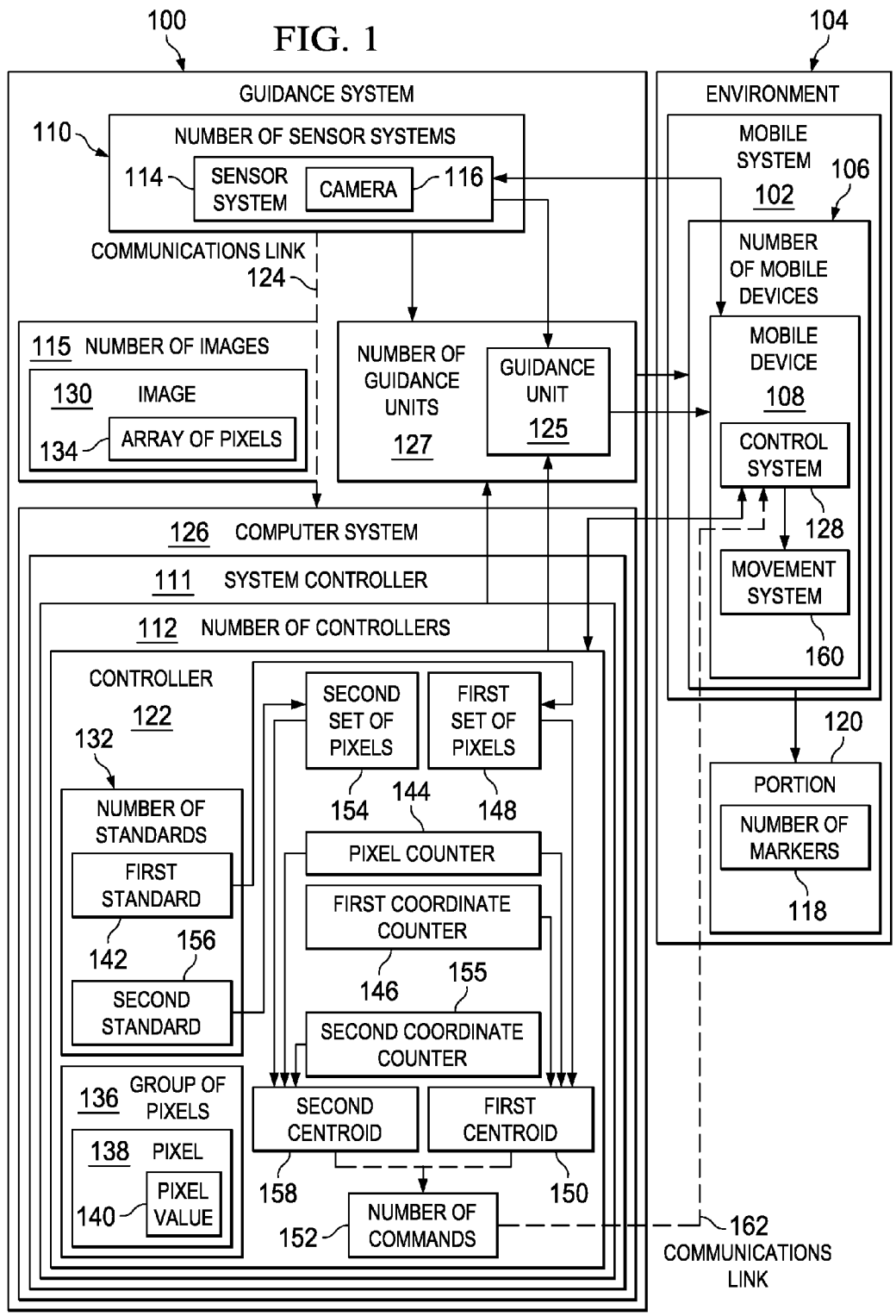
FIG. 1 is an illustration of a guidance system in the form of a block diagram in accordance with an illustrative embodiment.

With reference now to FIG. 1, an illustration of a guidance system in the form of a block diagram is depicted in accordance with an illustrative embodiment. In these illustrative examples, the guidance system 100 is configured to guide a mobile system 102 within an environment 104. In these illustrative examples, the mobile system 102 comprises a number of mobile devices 106. As used herein, a "number of" items means one or more items. For example, a number of mobile devices 106 means one or more mobile devices.

Each of these mobile devices 106 in the mobile system 102 is a machine or robot capable of moving without requiring human assistance. In other words, a mobile device 108 in the mobile system 102 may be capable of moving autonomously. However, the mobile system 102 may be configured to perform other operations semi-autonomously or autonomously.

The mobile device 108 may take any of a number of different forms. The mobile device 108 may be, for example, without limitation, an autonomous vehicle, a semi-autonomous vehicle, an automated guided vehicle, a mobile robot, a robotic arm, or some other suitable type of device capable of moving without human assistance.

Further, a mobile device 108 in the mobile system 102 may move within an environment 104 to perform one or more operations within the environment 104. For example, a mobile device 108 may be used to move materials, carry tools to a different location, tow objects, and/or perform other suitable types of operations within an environment 104. Depending on the implementation, the environment 104 may be selected from one of, for example, without limitation, a manufacturing facility, an industrial facility, a warehouse, an airport, a runway, a plant, a power station, a testing facility, a laboratory, a testing environment, an area of land, a surface of an object, a work station, or some other suitable type of environment.

In these illustrative examples, the guidance system 100 comprises a number of sensor systems 110 and a system controller 111 comprising a number of controllers 112. Each of the sensor systems 110 in the guidance system 100 is associated with a corresponding mobile device in the mobile system 102. As used herein, when one component is "associated" with another component, the association is a physical association.

For example, a first component, such as a sensor system 114 in the guidance system 100, may be considered to be associated with a second component, such as a mobile device 108 in the mobile system 102, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or as an extension of the second component.

A sensor system 114 associated with a mobile device 108 is configured to generate a number of images 115 of the environment 104 in which the mobile device 108 is located. In particular, the sensor system 114 is configured to generate images 115 of the portion 120 of the environment around the mobile device 108. In these illustrative examples, the portion 120 of the environment 104 captured in the images 115 may be located in front of the mobile device 108. Further, the portion 120 of the environment 104 captured in the images 115 may change as the mobile device 108 moves within the environment 104.

In these illustrative examples, the sensor system 114 may have a field of view that is centered with respect to a center axis through the mobile device 108. Of course, in other illustrative examples, the field of view for the sensor system 114 may be off-center with respect to a center axis through the mobile device 108. The images 115 generated by the sensor system 114 are color images in these illustrative examples. However, in some cases, the images 115 may be grayscale images.

One or more of the images 115 generated by the sensor system 114 may capture a number of markers 118 placed in the environment 104. As used herein, a "marker" is an item used for guiding a mobile device 108 along a particular path. In these illustrative examples, the markers 118 in the environment 104 may comprise at least one of a piece of colored tape attached to the ground of the environment 104, a colored line drawn on the ground of the environment 104, a colored line projected onto the ground of the environment 104, a colored shape on the ground of the environment 104, a laser line projected onto the ground of the environment 104, or some other type of marker that is visible to the sensor system 114.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; or some other suitable combination.

In one illustrative example, the sensor system 114 comprises a camera 116 that generates the images 115. The camera 116 may be, for example, without limitation, a video camera. The camera 116 may be configured to generate the images 115 at a specified rate. This rate may be, for example, without limitation, one image about every 0.9 seconds. The images 115 generated by the camera 116 may form a video of the environment 104.

In some cases, one or more parameters for the camera 116 may be adjusted to change the portion 120 of the environment 104 captured in the environment 104. These parameters may include, for example, without limitation, a field of view, a magnification, and/or some other type of parameter for the camera 116.

As depicted, the sensor system 114 is configured to send the images 115 generated to a controller 122 corresponding to the mobile device 108. The sensor system 114 sends the images 115 to the controller 122 over a communications link 124. This communications link 124 may comprise at least one of a wireless communications link, a wired communications link, an optical communications link, and some other suitable type of communications link.

Further, the images 115 generated by the sensor system 114 may be sent to the controller 122 as the images 115 are generated without any unintentional delays. In other words, the images 115 generated by the sensor system 114 may be sent to the controller 122 in "substantially real-time".

The controller 122 is an example of one of the number of controllers 112 that make up the system controller 111. The system controller 111 is configured to use the images generated by each mobile device in the mobile system 102 to guide these mobile devices 106 within the environment 104.

The system controller 111 may be implemented using hardware, software, or a combination of the two. Further, each of the controllers 112 in the system controller 111 may be implemented using hardware, software, or a combination of the two.

In one illustrative example, the system controller 111 is implemented in a computer system 126. The computer system 126 may comprise a number of computers. When more than one computer is present in the computer system 126, these computers may be in communication with each other. Further, these computers may be located in the same and/or different locations. For example, one or more of these computers may be in locations within the environment 104 and/or one or more of these computers may be in locations remote to the environment 104.

In another illustrative example, each controller 122 in the system controller 111 may be implemented in a control system 128 in the mobile device 108. For example, the controller 122 may be considered part of the control system 128. The control system 128 may be, for example, without limitation, a computer system, a processor unit, an integrated circuit, a printed circuit board, or some other suitable type of electronic hardware system.

When the controller 122 is implemented in the control system 128 of the mobile device 108, the sensor system 114 and the controller 122 together form a guidance unit 125 in the guidance system 100 for the mobile device 108. In this manner, the different sensor systems 110 and controllers 112 in the guidance system 100 may form a number of guidance units 127 in the guidance system 100. Each of the guidance units 127 is configured to control and guide the movement of a corresponding mobile device 108. A guidance unit 125 may be considered separate from or part of the mobile device 108, depending on the implementation.

In response to receiving an image 130 from the sensor system 114 over the communications link 124, the controller 122 processes the image 130. The controller 122 identifies a number of standards 132 for processing the image 130. As used herein, a "standard" comprises at least one of a number of criteria, rules, requirements, and/or guidelines for identifying pixels of interest in the image 130 for use in guiding mobile device 108.

As depicted, the image 130 comprises an array of pixels 134. The controller 122 identifies a group of pixels 136 from the array of pixels 134 in the image 130 for processing. As used herein, a "group of" with reference to items means two or more items. In this manner, a group of pixels 136 means two or more pixels.

In some cases, the group of pixels 136 may be identified based on predefined locations for pixels in the array of pixels 134 in the image 130. These locations may be defined with respect to at least two coordinate axes for the array of pixels 134. The number of coordinate axes depends on the number of dimensions for the array of pixels 134.

In one illustrative example, the array of pixels 134 is a two-dimensional array that may be described with respect to an x-axis and a y-axis. In this example, a location for a pixel in the array of pixels 134 may be defined with respect to a coordinate value for the x-axis and a coordinate value for the y-axis. The coordinate value for the x-axis may be referred to as an x-coordinate and the coordinate value for the y-axis may be referred to as a y-coordinate.

The controller 122 begins processing the image 130 by selecting a pixel 138 in the group of pixels 136. The pixel 138 has a pixel value 140. This pixel value 140 may be, for example, an intensity value. When the image 130 is a color image, the intensity value may be based on a red-green-blue (RGB) model. With this type of model, the intensity value comprises a red value, a green value, and a blue value. Each of the red value, the green value, and the blue value may be selected from a range of values between 0 and 255. When the image 130 is a grayscale image, the intensity value is a brightness value selected from a range of values between 0 and 255.

The controller 122 determines whether the pixel value 140 of the pixel 138 meets a standard selected from the number of standards 132 identified by the controller 122. For example, the controller 122 may determine whether the pixel value 140 of the pixel 138 meets a first standard 142. The first standard 142 may comprise a number of criteria for the pixel value 140. These criteria may be selected such that any pixels in the image 130 matching a first selected color within selected tolerances may be identified.

In other words, the criteria of the first standard 142 define a first selected color. The group of pixels 136 identified in the image 130 is processed to determine whether this first selected color is detected in the image 130. The first selected color may be detected when at least one of the group of pixels 136 matches the first selected color within selected tolerances.

As one illustrative example, the criteria for the pixel value 140 may include a selected range for at least one of the red value, the green value, and the blue value that make up the pixel value 140. The pixel value 140 may meet the first standard 142 when the red value, the green value, and the blue value fall within these selected ranges. As another illustrative example, the criteria for the pixel value 140 may be that one of the red value, the green value, and the blue value be a selected percentage greater than the other values.

In response to a determination that the pixel value 140 of the pixel 138 meets the first standard 142, the controller 122 increments a pixel counter 144 and increments a first coordinate counter 146. The pixel counter 144 is configured to keep count of the number of pixels that meet the first standard 142 during processing of the image. The first coordinate counter 146 is configured to keep track of the different coordinate values for the pixels that meet the first standard 142 with respect to a particular axis.

In some illustrative examples, the pixel counter 144 is incremented by one. However, in other illustrative examples, the pixel counter 144 is incremented by a weighted value for the pixel 138. The weighted value may be based on, for example, the location of the pixel 138 within the array of pixels 134 in the image 130. For example, pixels located at the bottom of the image 130 may be weighted higher than pixels located at the top of the image 130. In this manner, pixels corresponding to the portion of the environment 104 located further away from the mobile device 108 may be weighted lower than pixels corresponding to the portion of the environment 104 located closer to the mobile device 108.

Further, the first coordinate counter 146 is incremented by a coordinate value for the location of the pixel 138 with respect to a selected axis. For example, the first coordinate counter 146 may be incremented by the x-coordinate of the location of the pixel 138. Of course, in other illustrative examples, the first coordinate counter 146 may be incremented by the y-coordinate of the location of the pixel 138.

The controller 122 performs the steps of determining whether a pixel 138 meets the first standard 142, incrementing the pixel counter 144 in response to the pixel 138 meeting the first standard 142, and incrementing the first coordinate counter 146 in response to the pixel 138 meeting the first standard 142 for each pixel in the group of pixels 136 identified in the image 130 for processing. The portion of the group of pixels 136 that meets the first standard 142 forms a first set of pixels 148.

As used herein, a "set of" items means zero or more items. In other words, the set of items may be a null or empty set. In this manner, the first set of pixels 148 may include zero, one, two, ten, twenty, or some other number of pixels.

The first set of pixels 148 is a null set when no pixels in the group of pixels 136 meet the first standard 142. The first set of pixels 148 is not a null set when at least one pixel in the group of pixels 136 meets the first standard 142. In other words, the first set of pixels 148 includes any pixels in the group of pixels 136 that match the color defined by the criteria of the first standard 142 within selected tolerances.

After all of the pixels in the group of pixels 136 have been processed, the controller 122 identifies a first centroid 150 for the first set of pixels 148 that meet the first standard 142. The first centroid 150 corresponds to the first selected color indicated by the first standard 142. As one illustrative example, if the first standard 142 is defined for a red color, the first centroid 150 corresponds to this red color. Further, the first centroid 150 may be referred to as a red centroid.

In these illustrative examples, the first centroid 150 is an average coordinate value for the first set of pixels 148. For example, the controller 122 may divide the first coordinate counter 146 by the pixel counter 144 to generate the first centroid 150.

When the first coordinate counter 146 is configured to count x-coordinates, the first centroid 150 is an average x-coordinate. When the first coordinate counter 146 is configured to count y-coordinates, the first centroid 150 is an average y-coordinate.

Further, when the first set of pixels 148 is a null set, the pixel counter 144 is zero. When the pixel counter 144 is zero, the controller 122 may identify a default value as the first centroid 150. This default value may be, for example, a center coordinate value, an error value, or some other suitable type of value. The center coordinate value may be, for example, the center x-coordinate with respect to the x-axis for the array of pixels 134 in the image 130.

Thereafter, the controller 122 generates a number of commands 152 for guiding the mobile device 108 based on first centroid 150. Further, the commands 152 generated by the controller 122 may also be based on the particular standard with respect to which the image 130 is being processed. The number of commands 152 may comprise at least one of a move command, a change direction command, a stop command, a turn off command, a turn command, a reverse command, a change speed command, and a change type of movement command.

In some cases, the number of commands 152 may include a command to request instructions from a main computer system. In other illustrative examples, the number of commands 152 may include a command to perform one or more operations at the current location of the mobile device 108 within the environment 104. For example, without limitation, an operation may be registering the current location of the mobile device 108, dropping a payload, moving a robotic arm attached to the mobile device 108, turning on a light on the mobile device 108, turning off a light on the mobile device 108, generating a sound, sending an alert to a main computer system, or some other suitable type of operation.

For example, when the first centroid 150 is an x-coordinate that is located to the right of a center x-coordinate for the image 130, the controller 122 may generate a command to move the mobile device forward and a command to turn the mobile device to the right. When the first centroid 150 is an x-coordinate that is located to the left of a center x-coordinate for the image 130, the controller 122 may generate a command to move the mobile device forward and a command to turn the mobile device to the left.

When the first centroid 150 is the same as the center x-coordinate for the image 130, the controller 122 may generate a command to move the mobile device forward without turning or changing directions. Further, when the first centroid 150 is the default value, the controller 122 may generate a command to stop the mobile device 108.

In some illustrative examples, the controller 122 may also be configured to process the image 130 to identify any pixels in the image 130 that meet one of the other standards 132. For example, the controller 122 may process the group of pixels 136 using the method described above to identify a second set of pixels 154 that meet a second standard 156. The second standard 156 may comprise a number of criteria for the pixel value 140. These criteria may be selected such that any pixels in the image 130 matching a second selected color within selected tolerances may be identified.

Further, when processing the group of pixels 136 using the second standard 156, the controller 122 increments a second coordinate counter 155 in response to a pixel value 140 of a pixel 138 meeting the second standard 156.

The controller 122 may identify a second centroid 158 for the second set of pixels 154 by dividing the second coordinate counter 155 by the pixel counter 144. The second centroid 158 corresponds to the second selected color indicated by the second standard 156. As one illustrative example, if the second standard 156 is defined for a green color, the second centroid 158 corresponds to this green color. The second centroid 158 may be referred to as a green centroid. The controller 122 is configured to generate the commands 152 for guiding the mobile device 108 based on at least one of the first centroid 150 and the second centroid 158.

In this manner, the controller 122 may be able to identify multiple centroids in which each centroid is identified based on a different one of the standards 132. Further, each of these standards 132 may correspond to a different color. Thus, the commands 152 generated based on these multiple centroids may be color-specific.

Additionally, the controller 122 may use the spatial relationships of the multiple centroids to generate the commands 152. In one illustrative example, the first centroid 150 may be a red centroid and the second centroid 158 may be a green centroid. In response to identifying the red centroid and the green centroid, the controller 122 may determine whether the red centroid is to the left or right of the green centroid. The commands 152 generated when the red centroid is to the left of the green centroid may be different from the commands 152 generated when the red centroid is to the right of the green centroid.

Further, when the controller 122 identifies multiple centroids, the controller 122 may be configured to identify a geometric pattern with respect to these centroids. The controller 122 may generate the commands 152 based on the identification of this pattern.

As one illustrative example, the controller 122 may be configured to identify a red centroid, a green centroid, a blue centroid, and a yellow centroid. Once these centroids have been identified in one of the images 115 received from the sensor system 114, the controller 122 may determine whether the centroids meet at least one of a number of selected patterns defined by the standards 132. These selected patterns may take various forms.

In one illustrative example, a selected pattern may be a particular spatial order for the four centroids representing the four different colors with respect to a particular coordinate axis. This order may be, for example, without limitation, from left to right, the red centroid, the yellow centroid, the green centroid, and the blue centroid. The controller 122 may generate one or more commands 152 based on whether the centroids meet the selected pattern.

In another illustrative example, a selected pattern may be a two-dimensional pattern formed in the plane formed by the x-axis and the y-axis. The two-dimensional pattern may be, for example, without limitation, a square, a triangle, or some other suitable type of polygon. In some cases, the controller 122 may identify multiple centroids corresponding to different colors. The controller 122 may determine whether these centroids form the corners of a selected polygon in the x-y plane to determine whether the centroids meet the selected pattern.

Further, the controller 122 may also determine whether the arrangement of the centroids at the corners of the selected polygon meets a selected pattern. For example, without limitation, the controller 122 may determine that a red centroid, a yellow centroid, and a blue centroid form a triangle in the x-y plane. However, the commands 152 generated when the red centroid is at the left corner, the yellow centroid is at the top corner, and the blue centroid is at the right corner may be different from the commands 152 generated when the red centroid is at the left corner, the blue centroid is at the top corner, and the yellow centroid is at the right corner.

Still further, the controller 122 may determine whether multiple centroids meet a concentric ring pattern. For example, without limitation, the controller 122 may determine whether multiple centroids correspond to substantially the same location in the x-y plane.

In this manner, the controller 122 may be able to determine whether the centroids identified for one of the images 115 generated by the sensor system 114 meets at least one of a number of selected patterns. In particular, the standards 132 may be used to create a coding scheme for the centroids identified. The controller 122 may use the coding scheme to determine which commands 152 are to be generated by the controller 122 based on the one or more centroids identified for the images 115 generated by the sensor system 114.

When the controller 122 is part of the control system 128 in the mobile device 108, the commands 152 may be sent from the control system 128 to a movement system 160 in the mobile device 108. This movement system 160 may comprise at least one of an actuator system, a robotic movement system, a motorized wheel system, a hydroelectric movement system, an electronic gear system, a track system, a rail system, and/or some other suitable type of movement system.

However, when the controller 122 is implemented in a computer system 126 in a location remote to the mobile device 108, the controller 122 may send the commands 152 to the control system 128 in the mobile device 108. The commands may be sent over a communications link 162. This communications link 162 may comprise at least one of a wireless communications link, a wired communications link, an optical communications link, and some other suitable type of communications link.

In this manner, the guidance system 100 may be configured to control and guide movement of the different mobile devices 106 in the mobile system 102 within the environment 104. When all of the controllers 112 in the system controller 111 are implemented in corresponding control systems in the mobile devices 106, the guidance system 100 may be considered part of the mobile system 102.

In some cases, the sensor system 114 associated with a mobile device 108 and the controller 122 implemented in a control system 128 in the mobile device 108 may be together considered a device guidance system. In this manner, the guidance system 100 may comprise a number of device guidance systems corresponding to the number of mobile devices 106 in the mobile system 102. In some illustrative examples, a device guidance system may be considered part of the mobile device 108, depending on the implementation.

With a controller such as the controller 122 described above, the sensor system 114 used for the mobile device 108 may be attached to the mobile device 108 away from the ground of the environment 104. In particular, the controller 122 may be able to identify centroids based on the standards 132 for the images 115 generated when the sensor system 114 is located away from the ground of the environment 104. Consequently, the sensor system 114 may be attached to the mobile device 108 at a distance from the ground of the environment 104 selected to reduce the possibility of objects on the ground causing undesired effects to the sensor system 114 as the mobile device 108 moves on the ground.

Further, the sensor system 114 attached to a mobile device 108 may comprise a single video camera in these illustrative examples. Further, each of the sensor systems 110 in the guidance system 100 may be a single video camera attached to a corresponding mobile device in the mobile devices 106 in the mobile system 102. In this manner, the size, weight, and/or cost of the sensor systems 110 used in the guidance system 100 may be reduced as compared to some currently available sensor systems used to guide mobile devices.

The illustration of the guidance system 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, the first coordinate counter 146 and/or the second coordinate counter 155 may be two-coordinate counters. For example, when the first coordinate counter 146 is a two-coordinate counter, the first coordinate counter 146 may be configured to keep track of both the x-coordinates and the y-coordinates for the locations of the pixels that meet the first standard 142.

In this manner, the first centroid 150 may then comprise an average x-coordinate and an average y-coordinate. The commands 152 generated by the controller 122 based on this type of first centroid 150 may, in some cases, include at least one of a move up command, a move down command, a hover command, a change altitude command, a roll command, or some other suitable type of command.

Figure 2:
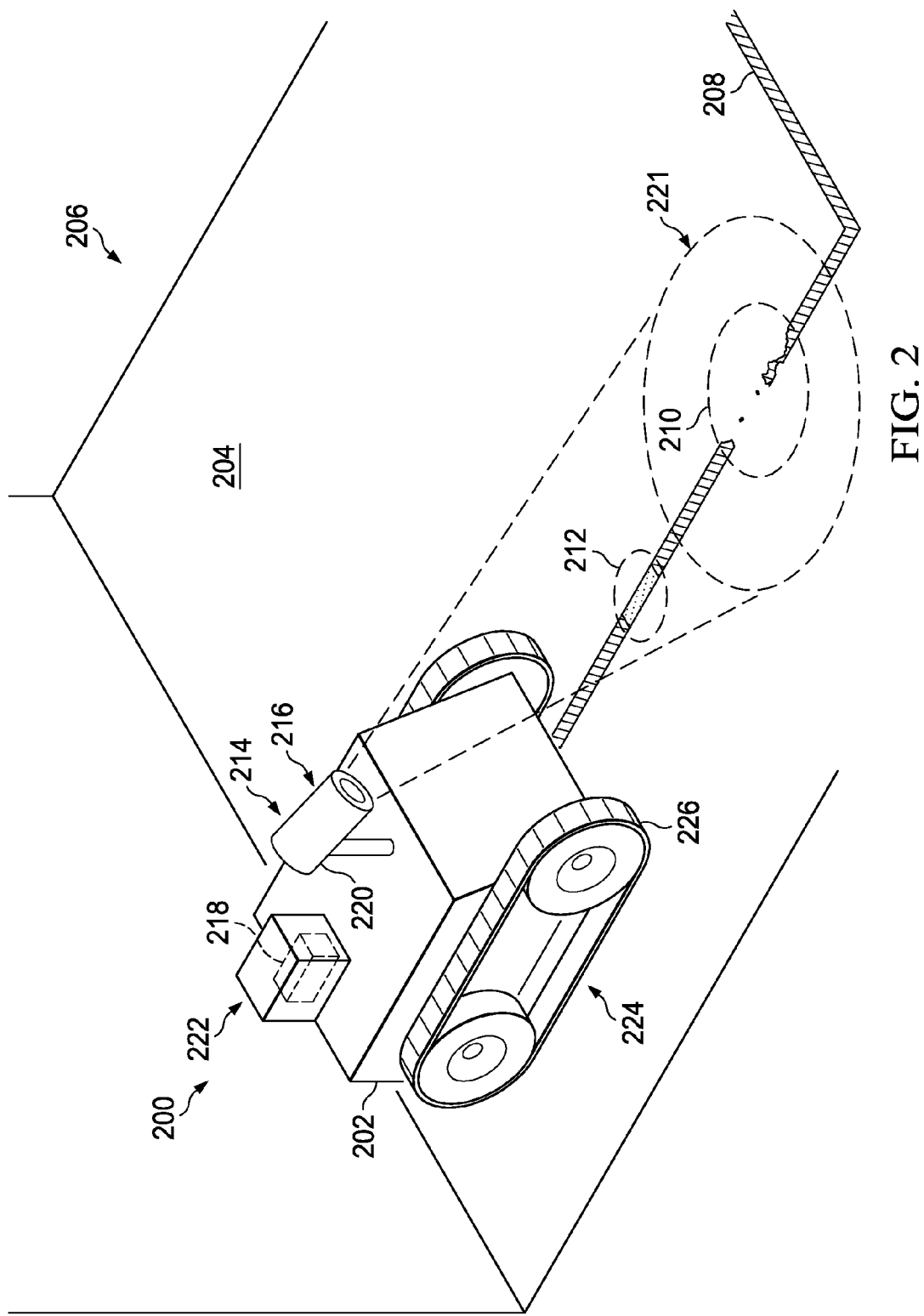
FIG. 2 is an illustration of a mobile device with a guidance unit in accordance with an illustrative embodiment.

With reference now to FIG. 2, an illustration of a mobile device with a guidance unit is depicted in accordance with an illustrative embodiment. In FIG. 2, the mobile device 200 is an example of one implementation for the mobile device 108 described in FIG. 1. As depicted, the mobile device 200 takes the form of an automated guided vehicle 202.

The mobile device 200 is configured to move on the ground 204 in a manufacturing facility 206. This manufacturing facility 206 is an example of one implementation for the environment 104 in FIG. 1.

In this illustrative example, colored tape 208 is present on the ground 204. The colored tape 208 may have, for example, a particular green color. The colored tape 208 defines a path on the ground 204 along which the mobile device 200 is to move. As depicted, a portion of the colored tape 208 may be broken off in a first location 210. Further, a portion of the colored tape 208 may be covered in dirt at a second location 212. The colored tape 208 at this second location 212 may have a different color than the particular green color of the rest of the colored tape 208.

In this illustrative example, the mobile device 200 has a guidance unit 214. This guidance unit 214 is an example of one implementation for the guidance unit 125 in FIG. 1. The guidance unit 214 is configured to control and guide movement of the mobile device 200. As depicted, the guidance unit 214 includes a sensor system 216 associated with the mobile device 200 and a controller 218. This sensor system 216 is an example of one implementation for the sensor system 114 in FIG. 1. Further, this controller 218 is an example of one implementation for the controller 122 in FIG. 1.

The sensor system 216 takes the form of a camera 220 in this example. The camera 220 is configured to generate images of the portion of the manufacturing facility 206 in front of the mobile device 200. In particular, the camera 220 is configured to generate images of the portion of the manufacturing facility 206 within a field of view 221 for the camera 220 in the form of a video. The camera 220 may send these images to the controller 218 as the images are generated.

As depicted, the controller 218 is implemented in a control system 222 in the mobile device 200. This control system 222 is an example of one implementation for the control system 128 in FIG. 1. In particular, this control system 222 takes the form of a computer in this illustrative example.

The controller 218 is configured to process each image received from the camera 220. For example, in response to receiving an image from the camera 220, the controller 218 identifies a set of pixels in the image that meet a standard. In some cases, the controller 218 may use weighting and/or filtering techniques to determine whether a pixel in the image is to be included in the set of pixels that meets a selected standard. The selected standard may be defined for a selected color.

In one illustrative example, the controller 218 only includes a pixel that meets a selected standard in the set of pixels when at least one adjacent pixel also meets the selected standard. As used herein, an "adjacent pixel" to a pixel is one that is immediately next to the pixel without any other pixels in between the pixel and the adjacent pixel.

In another illustrative example, the controller 218 applies weights to pixels that meet a selected standard based on the number of adjacent pixels that also meet the selected standard. In this manner, the controller 218 may use a number of methods for disregarding negligible or inconsequential amounts of color in an image.

The controller 218 identifies a centroid for the set of pixels that meet the standard. The controller 218 is able to identify a centroid even with the colored tape 208 being broken off in the first location 210 and covered in dirt at the second location 212. For example, the second location 212 may first come into the field of view 221 for the camera 220 as the mobile device 200 moves along the path defined by the colored tape 208.

The controller 218 is able to identify a centroid for the image generated by the camera 220 as long as at least one pixel in the group of pixels selected for processing from the image meets the standard. For example, the controller 218 may be able to identify a centroid as long as at least one pixel in the group of pixels matches the color of the colored tape 208 within selected tolerances.

Similarly, the controller 218 is able to identify a centroid for the image generated when the first location 210 is in the field of view 221 for the camera 220 as long as at least one pixel in the group of pixels selected for processing from the image meets the standard. In other words, the controller 218 may identify the centroid for an image of the first location 210 as long as a portion of the colored tape 208 is captured in the image.

Next, the controller 218 generates a number of commands for guiding the mobile device 200 along the path defined by the colored tape 208 based on the centroid. With the method for processing an image described earlier in FIG. 1, the controller 218 is configured to guide the mobile device 200 along the path defined by the colored tape 208 even when portions of the colored tape have been broken off and/or have changed color.

In some illustrative examples, the controller 218 determines whether a centroid that has been identified meets a number of selected criteria for using the centroid to generate commands. In other words, the controller 218 makes decisions, based on selected criteria, about a centroid that has been identified prior to using the centroid to generate commands for guiding the mobile device 200.

The selected criteria may be selected to ensure the validity and reliability of the centroid identified. In other words, the criteria may be used to ensure that the centroid was identified for the colored tape 208 and not random objects in the manufacturing facility 206. In particular, the criteria may be used to disregard a centroid that was identified for spurious color sources within the manufacturing facility 206.

As one illustrative example, the controller 218 determines whether the number of pixels in the set of pixels, identified as meeting the standard, that was used to generate the centroid is greater than a selected threshold. The number of pixels in the set of pixels used to generate the centroid may be referred to as the "mass" of the centroid.

The controller 218 sends the commands to a movement system 224 in the mobile device 200. In this illustrative example, the movement system 224 is a track system 226. The movement system 224 moves the mobile device 200 based on the commands received from the controller 218.

Figure 3:
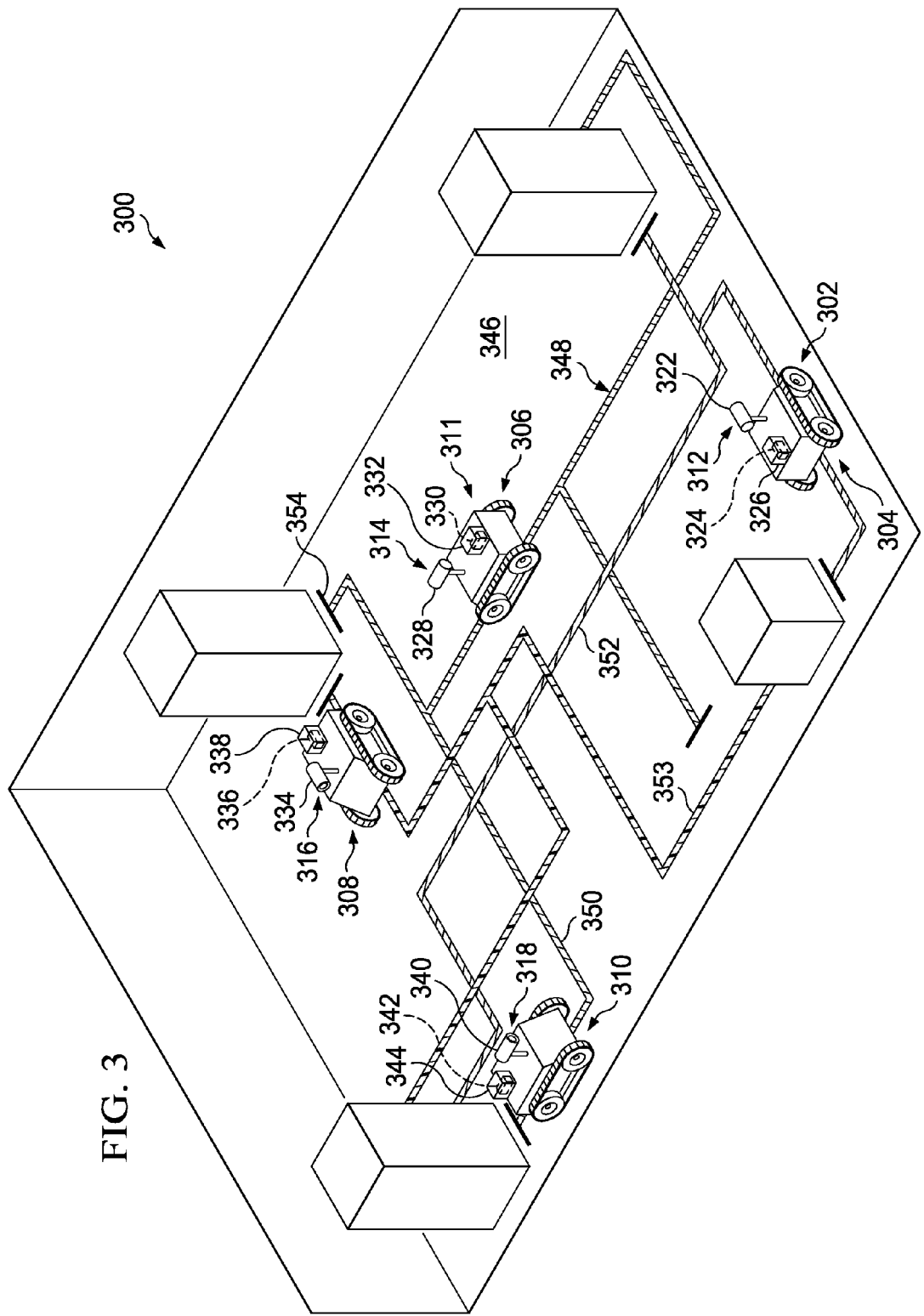
FIG. 3 is an illustration of a mobile system moving in a manufacturing facility in accordance with an illustrative embodiment.

With reference now to FIG. 3, an illustration of a mobile system moving in a manufacturing facility is depicted in accordance with an illustrative embodiment. In FIG. 3, the manufacturing facility 300 is an example of one implementation for the environment 104 in FIG. 1. Further, the mobile system 302 is an example of one implementation for the mobile system 102 in FIG. 1.

In this illustrative example, the mobile system 302 includes a first mobile device 304, a second mobile device 306, a third mobile device 308, and a fourth mobile device 310. Each of these mobile devices is an example of one implementation for the mobile device 108 in FIG. 1. In particular, each of these mobile devices may be implemented in the same manner as the mobile device 200 in FIG. 2.

In this illustrative example, a guidance system 311 is configured to guide the mobile system 302 within the manufacturing facility 300. In particular, the guidance system 311 is configured to steer the different mobile devices within the mobile system 302 throughout the manufacturing facility 300. The guidance system 311 comprises a first guidance unit 312, a second guidance unit 314, a third guidance unit 316, and a fourth guidance unit 318.

The first guidance unit 312, the second guidance unit 314, the third guidance unit 316, and the fourth guidance unit 318 are configured to guide the first mobile device 304, the second mobile device 306, the third mobile device 308, and the fourth mobile device 310, respectively. Each of these guidance units is an example of one implementation for the guidance unit 125 in FIG. 1. In particular, each of these guidance units may be implemented in the same manner as the guidance unit 214 in FIG. 2.

As depicted, the first guidance unit 312 comprises a first sensor system 322 associated with the first mobile device 304 and a first controller 324 implemented in a control system 326 for the first mobile device 304. The second guidance unit 314 comprises a second sensor system 328 associated with the second mobile device 306 and a second controller 330 implemented in a control system 332 for the second mobile device 306.

The third guidance unit 316 comprises a third sensor system 334 associated with the third mobile device 308 and a third controller 336 implemented in a control system 338 for the third mobile device 308. The fourth guidance unit 318 comprises a fourth sensor system 340 associated with the fourth mobile device 310 and a fourth controller 342 implemented in a control system 344 for the fourth mobile device 310.

In this illustrative example, the guidance system 311 is configured to guide the mobile system 302 along different paths on the ground 346 of the manufacturing facility 300.

In particular, the guidance system 311 uses images of the ground 346 generated by the first sensor system 322, the second sensor system 328, the third sensor system 334, and the fourth sensor system 340 to guide the mobile devices in the mobile system 302 along the different paths defined by the pieces of colored tape 348 on the ground 346. The colored tape 348 on the ground 346 may include, for example, without limitation, green tape 350, blue tape 352, purple tape 353, and red tape 354.

The first controller 324, the second controller 330, the third controller 336, and the fourth controller 342 are configured to receive and process the images generated by the sensor systems in the guidance system 311. The first controller 324, the second controller 330, the third controller 336, and the fourth controller 342 use these images to generate commands for the first mobile device 304, the second mobile device 306, the third mobile device 308, and the fourth mobile device 310, respectively.

For example, in response to detecting the green color of the green tape 350 in an image received from the first sensor system 322, the first controller 324 may generate commands for guiding the first mobile device 304 towards the green tape 350. The commands generated in response to the first controller 324 detecting the green color of the green tape 350 cause the first mobile device 304 to move at a faster speed than the commands generated in response to the first controller 324 detecting the blue color of the blue tape 352.

The commands generated in response to the first controller 324 detecting the blue color of the blue tape 352 cause the first mobile device 304 to move at a faster speed than the commands generated in response to the first controller 324 detecting the purple color of the purple tape 353. Further, the first controller 324 may generate a command that causes the first mobile device 304 to stop when the first controller 324 detects the red color of the red tape 354 within some selected distance from the first mobile device 304.

Figure 4:
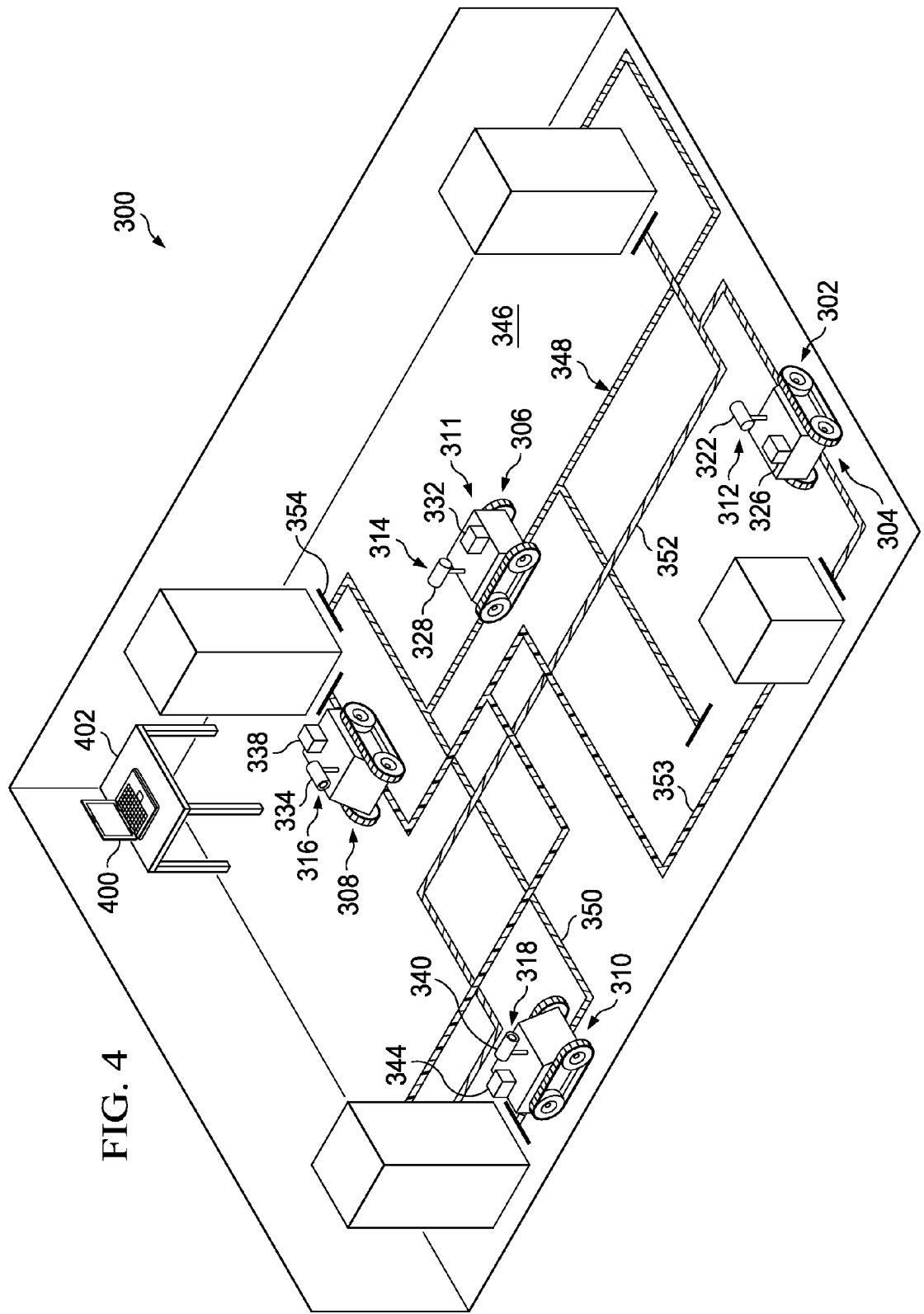
FIG. 4 is an illustration of a manufacturing facility in accordance with an illustrative embodiment.

With reference now to FIG. 4, an illustration of the manufacturing facility 300 from FIG. 3 is depicted in accordance with an illustrative embodiment. In FIG. 4, the guidance system 300 has a different configuration than the configuration for the guidance system 311 in FIG. 3.

In this illustrative example, the first controller 324 (not shown in this view), the second controller 330 (not shown in this view), the third controller 336 (not shown in this view), and the fourth controller 342 (not shown in this view) are implemented using software in a computer system 400. These controllers together form a system controller (not shown in this view) for the guidance system 311.

This system controller is an example of one implementation for the system controller 111 in FIG. 1. Further, this computer system 400 is an example of one implementation for the computer system 126 in FIG. 1. As depicted, the computer system 400 is located at a central work station 402 in the manufacturing facility 300. With this type of configuration for the guidance system 311, the controller and sensor system corresponding to a particular mobile device in the mobile system 302 may no longer be considered a guidance unit.

As depicted, the system controller in the computer system 400 is configured to receive the images generated by the first sensor system 322, the second sensor system 328, the third sensor system 334, and the fourth sensor system 340. In particular, these sensor systems may send images to the system controller wirelessly as the images are generated. The system controller processes these images to guide the first mobile device 304, the second mobile device 306, the third mobile device 308, and the fourth mobile device 310 along the ground 346 of the manufacturing facility 300 based on the paths defined by the colored tape 348.

In this illustrative example, the system controller may generate commands for a mobile device based on at least one of a centroid identified using an image generated by a sensor system associated with the mobile device and the centroid identified for another mobile device. Further, the system controller may use the different positions of the mobile devices in the mobile system 302 within the manufacturing facility 300 to generate commands.

Figure 5:
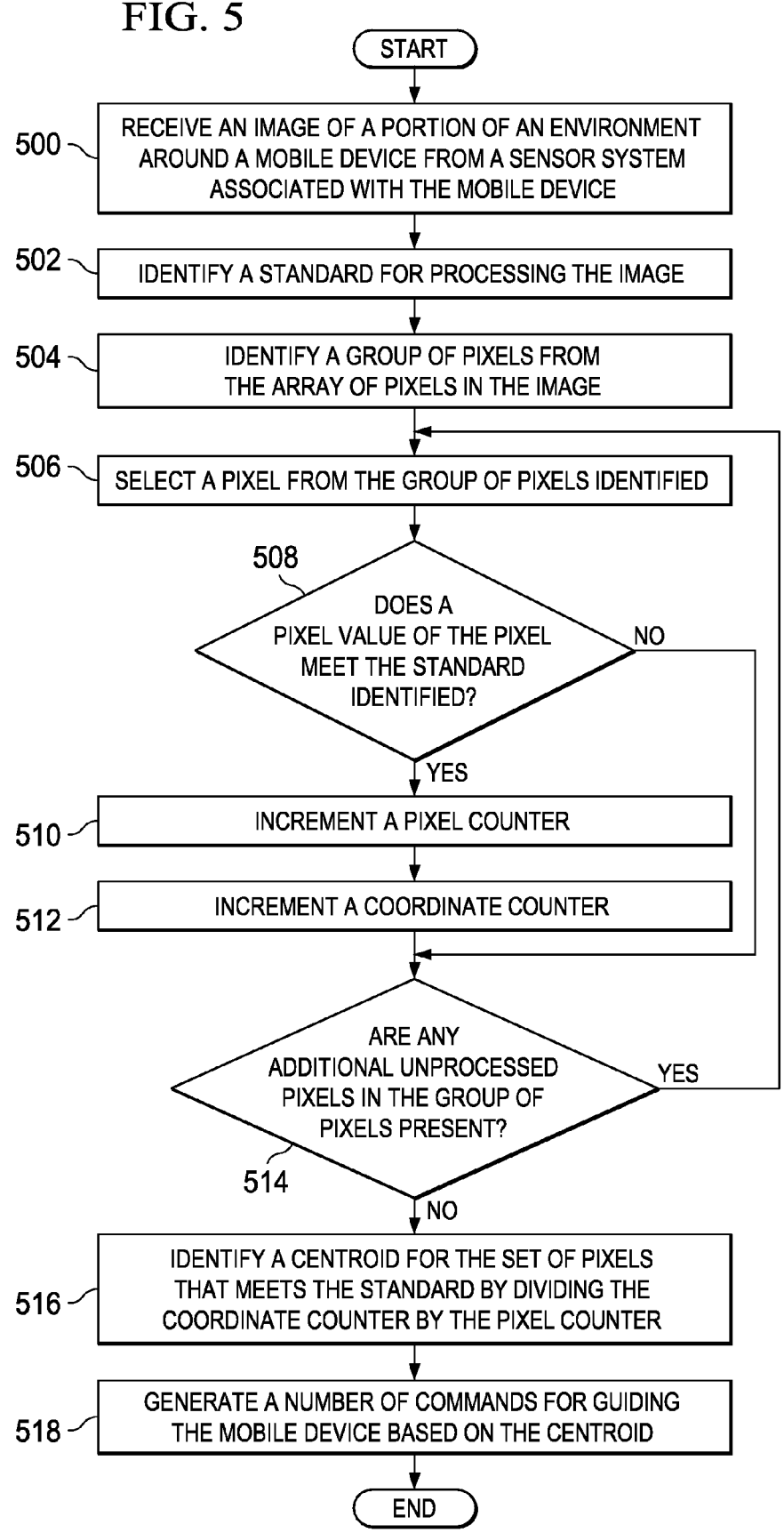
FIG. 5 is an illustration of a process for guiding a mobile device, in the form of a flowchart, in accordance with an illustrative embodiment.

With reference now to FIG. 5, an illustration of a process for guiding a mobile device, in the form of a flowchart, is depicted in accordance with an illustrative embodiment. The process illustrated in FIG. 5 may be implemented using guidance system 100 in FIG. 1. In particular, this process may be implemented using the controller 122 in FIG. 1.

The process begins by receiving an image of a portion of an environment around a mobile device from a sensor system associated with the mobile device (operation 500). Thereafter, the process identifies a standard for processing the image (operation 502). The process then identifies a group of pixels from the array of pixels in the image (operation 504). This operation 504 may be performed based on predefined locations for the group of pixels.

The process then selects a pixel from the group of pixels identified (operation 506). The process determines whether a pixel value of the pixel meets the standard identified (operation 508). If the pixel value meets the standard, the process increments a pixel counter (operation 510). Depending on the implementation, the pixel counter may be incremented by one or by a weighted value for the pixel in the operation 510.

In some illustrative examples, in operation 510, the weighted value for the pixel may be based on the location of the pixel within the image. Further, in some illustrative examples, the weighted value for the pixel may be based on the number of adjacent pixels also identified as meeting the standard.

Thereafter, the process increments a coordinate counter (operation 512). This operation 512 may be performed by incrementing the coordinate counter by a coordinate value for the location of the pixel in the image.

The process then determines whether any additional unprocessed pixels in the group of pixels are present (operation 514). When all of the pixels in the group of pixels have been processed, a set of pixels that meets the standard is identified. This set may be a null set in some cases.

With respect to the operation 514, if any additional unprocessed pixels are present, the process returns to operation 506. Otherwise, the process identifies a centroid for the set of pixels that meets the standard by dividing the coordinate counter by the pixel counter (operation 516). In this manner, the centroid is an average coordinate value.

Thereafter, the process generates a number of commands for guiding the mobile device based on the centroid (operation 518), with the process terminating thereafter. With reference again to operation 508, if the pixel value of the pixel does not meet the standard identified, the process proceeds to operation 514 as described above. The process described in FIG. 5 may be repeated for each image received from the sensor system associated with the mobile device.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative examples, operation 518 in FIG. 5 may only be performed after a decision about whether the centroid identified in operation 516 in FIG. 5 meets a number of selected criteria is made. For example, without limitation, operation 518 may only be performed when the mass of the centroid is greater than a selected threshold. The mass of the centroid is the number of pixels in the set of pixels identified as meeting the standard and used to generate the centroid.

With reference now to FIG. 6, an illustration of a data processing system is depicted in accordance with an illustrative embodiment. In this illustrative example, a data processing system 600 may be used to implement one or more computers in the computer system 126 in FIG. 1. In this illustrative example, the data processing system 600 includes a communications framework 602, which provides communications between a processor unit 604, a memory 606, persistent storage 608, a communications unit 610, an input/output (I/O) unit 612, and a display 614.

The processor unit 604 serves to execute instructions for software that may be loaded into the memory 606. The processor unit 604 may be a number of processors, a multi-processor core, or some other type of processor, depending on the particular implementation. As used herein, a "number of" items means one or more items. For example, a number of processors means one or more processors. Further, the processor unit 604 may be implemented using a number of heterogeneous processor systems in which a main processor is present with secondary processors on a single chip. As another illustrative example, the processor unit 604 may be a symmetric multi-processor system containing multiple processors of the same type.

The memory 606 and the persistent storage 608 are examples of storage devices 616. A storage device is any piece of hardware that is capable of storing information, such as, for example, without limitation, data, program code in functional form, and/or other suitable information either on a temporary basis and/or a permanent basis. The storage devices 616 also may be referred to as computer readable storage devices in these examples. The memory 606, in these examples, may be, for example, a random access memory or any other suitable volatile or non-volatile storage device. The persistent storage 608 may take various forms, depending on the particular implementation.

The persistent storage 608 may contain one or more components or devices. For example, the persistent storage 608 may include a hard drive, a flash memory, a rewritable optical disk, a rewritable magnetic tape, or some combination of the above. The media used by the persistent storage 608 also may be removable. For example, a removable hard drive may be used for the persistent storage 608.

The communications unit 610, in these examples, provides for communications with other data processing systems or devices. In these examples, the communications unit 610 is a network interface card. The communications unit 610 may provide communications through the use of either or both physical and wireless communications links.

The input/output unit 612 allows for input and output of data with other devices that may be connected to the data processing system 600. For example, the input/output unit 612 may provide a connection for user input through a keyboard, a mouse, and/or some other suitable input device. Further, the input/output unit 612 may send output to a printer. The display 614 provides a mechanism to display information to a user.

Instructions for the operating system, applications, and/or programs may be located in the storage devices 616, which are in communication with the processor unit 604 through the communications framework 602. In these illustrative examples, the instructions are in a functional form on the persistent storage 608. These instructions may be loaded into the memory 606 for execution by the processor unit 604. The processes of the different illustrative embodiments may be performed by the processor unit 604 using computer-implemented instructions, which may be located in a memory, such as the memory 606.

These instructions are referred to as program code, computer usable program code, or computer readable program code that may be read and executed by a processor in the processor unit 604. The program code in the different embodiments may be embodied on different physical or computer readable storage media, such as the memory 606 or the persistent storage 608.

Program code 618 is located in a functional form on computer readable media 620 that is selectively removable and may be loaded onto or transferred to the data processing system 600 for execution by the processor unit 604. The program code 618 and the computer readable media 620 form a computer program product 622 in these illustrative examples. In one example, the computer readable media 620 may be computer readable storage media 624 or computer readable signal media 626.

The computer readable storage media 624 may include, for example, an optical or magnetic disk that is inserted or placed into a drive or other device that is part of the persistent storage 608 for transfer onto a storage device, such as a hard drive, that is part of the persistent storage 608. The computer readable storage media 624 also may take the form of a persistent storage, such as a hard drive, a thumb drive, or a flash memory, that is connected to the data processing system 600.

In these examples, the computer readable storage media 624 is a physical or tangible storage device used to store the program code 618 rather than a medium that propagates or transmits the program code 618. The computer readable storage media 624 is also referred to as a computer readable tangible storage device or a computer readable physical storage device. In other words, the computer readable storage media 624 is a media that can be touched by a person.

Alternatively, the program code 618 may be transferred to the data processing system 600 using the computer readable signal media 626. The computer readable signal media 626 may be, for example, a propagated data signal containing the program code 618. For example, the computer readable signal media 626 may be an electromagnetic signal, an optical signal, and/or any other suitable type of signal. These signals may be transmitted over a communications link, such as a wireless communications links, an optical fiber cable, a coaxial cable, a wire, and/or any other suitable type of communications link. In other words, the communications link and/or the connection may be physical or wireless in the illustrative examples.

In some illustrative embodiments, the program code 618 may be downloaded over a network to the persistent storage 608 from another device or data processing system through the computer readable signal media 626 for use within the data processing system 600. For instance, program code stored in a computer readable storage medium in a server data processing system may be downloaded over a network from the server to the data processing system 600. The data processing system providing the program code 618 may be a server computer, a client computer, or some other device capable of storing and transmitting the program code 618.

The different components illustrated for the data processing system 600 are not meant to provide architectural limitations to the manner in which different embodiments may be implemented. The different illustrative embodiments may be implemented in a data processing system including components in addition to or in place of those illustrated for the data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, the processor unit 604 may take the form of a hardware unit that has circuits that are manufactured or configured for a particular use. This type of hardware may perform operations without needing program code to be loaded into a memory from a storage device to be configured to perform the operations.

For example, when the processor unit 604 takes the form of a hardware unit, the processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, the program code 618 may be omitted, because the processes for the different embodiments are implemented in a hardware unit.

In still another illustrative example, the processor unit 604 may be implemented using a combination of processors found in computers and hardware units. The processor unit 604 may have a number of hardware units and a number of processors that are configured to run the program code 618. With this depicted example, some of the processes may be implemented in the number of hardware units, while other processes may be implemented in the number of processors.

In another example, a bus system may be used to implement the communications framework 602 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, the memory 606, or a cache, such as found in an interface and memory controller hub that may be present in the communications framework 602.

Thus, the different illustrative embodiments provide a method, apparatus, and system for guiding a number of mobile devices. In one illustrative embodiment, an image is received of a portion of an environment around a mobile device in the number of mobile devices from a sensor system associated with the mobile device. A set of pixels is identified in the image that meets a standard. A centroid is identified for the set of pixels that meets the standard. A number of commands is generated for guiding the mobile device within the environment based on the centroid.

The different illustrative embodiments provide a guidance system, such as the guidance system 100 in FIG. 1, which allows a mobile device, such as the mobile device 108 in FIG. 1, to follow colored tape with a desired level of accuracy even when the colored tape has experienced undesired effects. Further, the guidance system 100 may be less expensive, smaller, and lighter as compared to some currently available guidance systems.

Additionally, the controller 122 in the guidance system 100 generating the commands 152 to guide the mobile device 108 may be reconfigurable. In particular, the standards 132 used by the controller 122 to guide the mobile device 108 may be changed over time. For example, the controller 122 may be reprogrammed over time to take into account new standards. Further, the controller 122 may be reprogrammed over time such that new commands are generated for previously defined standards 132.

In this manner, the guidance system 100 provided by the different illustrative embodiments may be adaptable to new situations over time. Further, the algorithms used by the controllers 112 in the guidance system 100 may be sufficiently simple such that the amount and/or complexity of the hardware needed to guide the mobile device 108, such as the sensor system 114, may be reduced as compared to some currently available guidance systems.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for guiding a number of mobile devices, the method comprising:
    receiving an image of a portion of an environment around a mobile device in the number of mobile devices from a sensor system associated with the mobile device;
    identifying a group of pixels from an array of pixels in the image for processing; determining whether a pixel in the group of pixels meets a standard, wherein the standard comprises a number of criteria for a pixel value of the pixel;
    incrementing a pixel counter in response to the pixel meeting the standard;
    incrementing a coordinate counter by a coordinate value for the pixel in response to the pixel meeting the standard; and
    performing the steps of determining whether the pixel in the group of pixels meets the standard, incrementing the pixel counter, and incrementing the coordinate counter for each pixel in the group of pixels;
    identifying a centroid for a set of pixels that meets the standard; and
    generating a number of commands for guiding the mobile device within the environment based on the centroid.

2. The method of claim 1 further comprising:
    sending the number of commands to the mobile device.

3. The method of claim 1, wherein the step of determining whether the pixel in the group of pixels meets the standard comprises:
    determining whether the pixel in the group of pixels meets the number of criteria for the pixel value of the pixel, wherein the pixel value of the pixel is an intensity value comprising a red value, a blue value, and a green value, and wherein the number of criteria includes a selected range for at least one of the red value, the blue value, and the green value.

4. The method of claim 1, wherein the step of incrementing the pixel counter in response to the pixel meeting the standard comprises:
    incrementing the pixel counter by a weighted value for the pixel in response to the pixel meeting the standard.

5. The method of claim 1, wherein the step of identifying the centroid for the set of pixels that meets the standard comprises:
    dividing the coordinate counter by the pixel counter to generate the centroid, wherein the centroid is an average coordinate value.

6. The method of claim 1, wherein the step of generating the number of commands for guiding the mobile device within the environment based on the centroid comprises:
    generating the number of commands for guiding the mobile device within the environment based on the centroid, wherein the number of commands comprises at least one of a stop command, a turn off command, a turn command, a reverse command, a change speed command, and a change type of movement command.

7. The method of claim 1, wherein the standard is a first standard, the set of pixels is a first set of pixels, and the centroid is a first centroid; further comprising:
    identifying a second set of pixels in the image that meets a second standard; and
    identifying a second centroid for the second set of pixels that meets the second standard.

8. The method of claim 7, wherein the step of generating the number of commands for guiding the mobile device within the environment based on the centroid comprises:
    generating the number of commands for guiding the mobile device within the environment based on at least one of the first centroid and the second centroid.

9. The method of claim 1 further comprising:
    generating the number of commands for guiding the mobile device based on the centroid and another centroid identified for use in guiding another mobile device in the number of mobile devices.

10. An apparatus comprising:
    a sensor system associated with a mobile device and configured to generate an image of a portion of an environment around the mobile device, wherein the image comprises an array of pixels and wherein a controller is configured to identify a set of pixels in the image that meets a standard by determining whether a pixel in a group of pixels identified from the array of pixels meets the standard in which the standard comprises a number of criteria for a pixel value of the pixel, incrementing a pixel counter in response to the pixel meeting the standard, and incrementing a coordinate counter by a coordinate value for the pixel in response to the pixel meeting the standard for each pixel in the group of pixels; and
    the controller configured to receive the image of the portion of the environment around the mobile device from the sensor system; identify the set of pixels in the image that meets the standard; identify a centroid for the set of pixels that meets the standard; and generate a number of commands for guiding the mobile device within the environment based on the centroid.

11. The apparatus of claim 10, wherein the controller is configured to increment the pixel counter by a weighted value for the pixel in response to the pixel meeting the standard.

12. The apparatus of claim 10, wherein the centroid is an average coordinate value in which the controller is configured to identify the average coordinate value by dividing the coordinate counter by the pixel counter.

13. The apparatus of claim 10, wherein the pixel value of the pixel is an intensity value comprising a red value, a blue value, and a green value and wherein the number of criteria includes a selected range for at least one of the red value, the blue value, and the green value.

14. The apparatus of claim 10, wherein the standard is a first standard, the set of pixels is a first set of pixels, the centroid is a first centroid; and wherein the controller is configured to identify a second set of pixels in the image that meets a second standard, generate a second centroid for the second set of pixels that meets the second standard, and generate the number of commands for guiding the mobile device within the environment based on at least one of the first centroid and the second centroid.

15. The apparatus of claim 10, wherein the controller is implemented in a control system in the mobile device.

16. The apparatus of claim 10 further comprising:
a system controller comprising a number of controllers configured to guide a number of mobile devices, wherein the controller is one of the number of controllers and the mobile device is one of the number of mobile devices.

17. A guidance system comprising:
a number of sensor systems in which a sensor system in the number of sensor systems is associated with a corresponding mobile device in a number of mobile devices; and
a number of controllers in which a controller in the number of controllers is configured to: receive an image of a portion of an environment around a mobile device in the number of mobile devices from a corresponding sensor system in the number of sensor systems associated with the mobile device, identify a set of pixels in the image that meets a standard; identify a centroid for the set of pixels that meets the standard; and generate a number of commands for guiding the corresponding mobile device within the environment based on the centroid, wherein the controller is implemented in at least one of a control system in the mobile device and a computer system in a location remote to the mobile device, and wherein the controller is configured to identify the set of pixels in the image that meets the standard by determining whether a pixel in a group of pixels identified from an array of pixels in the image meets the standard in which the standard comprises a number of criteria for a pixel value of the pixel and incrementing a pixel counter and a coordinate counter in response to the pixel meeting the standard for each pixel in the group of pixels.

* * * * *